United States Patent
Yamashita et al.

(10) Patent No.: US 7,986,478 B2
(45) Date of Patent: Jul. 26, 2011

(54) LENS DRIVE DEVICE

(75) Inventors: Hiroshi Yamashita, Ichinomiya (JP); Suguru Ohishi, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/731,805

(22) Filed: Mar. 25, 2010

(65) Prior Publication Data
US 2010/0246035 A1 Sep. 30, 2010

(30) Foreign Application Priority Data

Mar. 26, 2009 (JP) ................................. 2009-077561
Jul. 13, 2009 (JP) ................................. 2009-165139
Feb. 19, 2010 (JP) ................................. 2010-034341

(51) Int. Cl.
*G02B 7/02* (2006.01)
(52) U.S. Cl. .................... 359/824; 359/814; 348/345
(58) Field of Classification Search .................. 359/824, 359/814; 369/44.14–44.16, 44.22; 396/55, 396/133; 348/345
See application file for complete search history.

(56) References Cited

U.S. PATENT DOCUMENTS

| | | | | |
|---|---|---|---|---|
| 7,477,462 B2 * | 1/2009 | Shyu et al. | ..................... | 359/824 |
| 7,499,231 B2 * | 3/2009 | Shyu et al. | ..................... | 359/824 |
| 7,612,957 B1 * | 11/2009 | Wu et al. | ........................ | 359/824 |
| 7,649,703 B2 * | 1/2010 | Shiraki et al. | .................. | 359/824 |
| 7,652,833 B2 * | 1/2010 | Honma | .......................... | 359/814 |
| 7,697,216 B2 * | 4/2010 | Wada et al. | .................... | 359/694 |

FOREIGN PATENT DOCUMENTS

JP 2007-94364 A 4/2007

* cited by examiner

*Primary Examiner* — Loha Ben
(74) *Attorney, Agent, or Firm* — Ditthavong Mori & Steiner, P.C.

(57) ABSTRACT

A lens drive device includes a lens holder for holding a lens; a cabinet to which the lens holder is attached so as to be capable of being displaced in a direction of an optical axis of the lens; and a drive part that uses a magnetic driving force to displace the holder in the direction of the optical axis. The drive part includes a magnet disposed on the lens holder and a coil opposed to the magnet. Here, the cabinet has a shape of an almost square in a direction perpendicular to the optical axis. Further, the drive part is disposed in a region R between an outer edge of the lens holder and a corner of the cabinet.

15 Claims, 18 Drawing Sheets

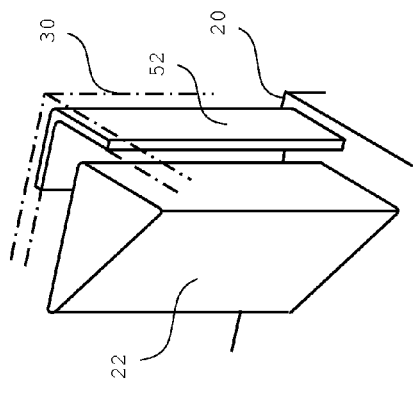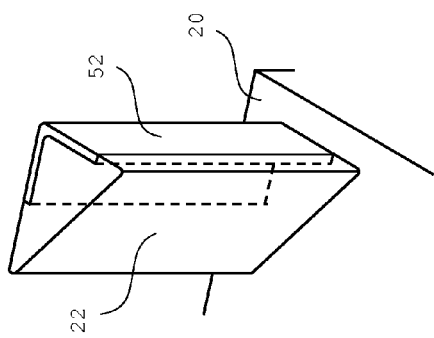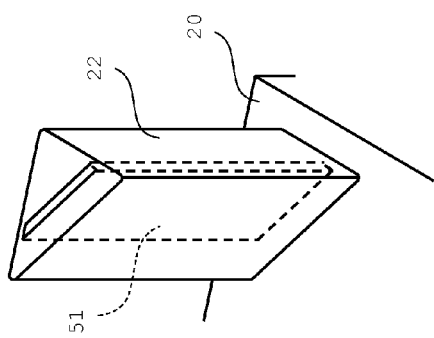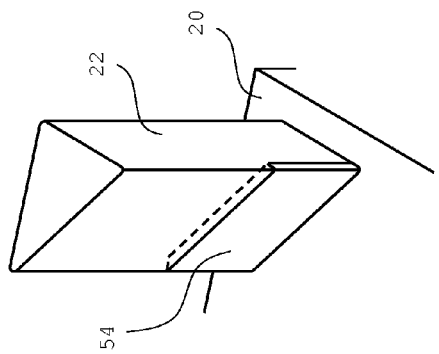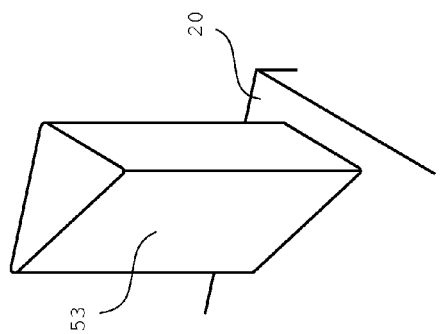

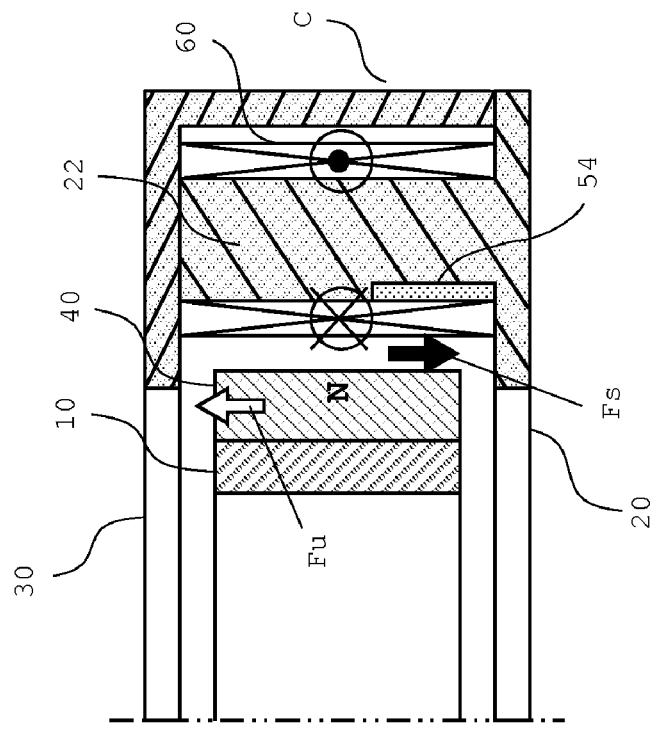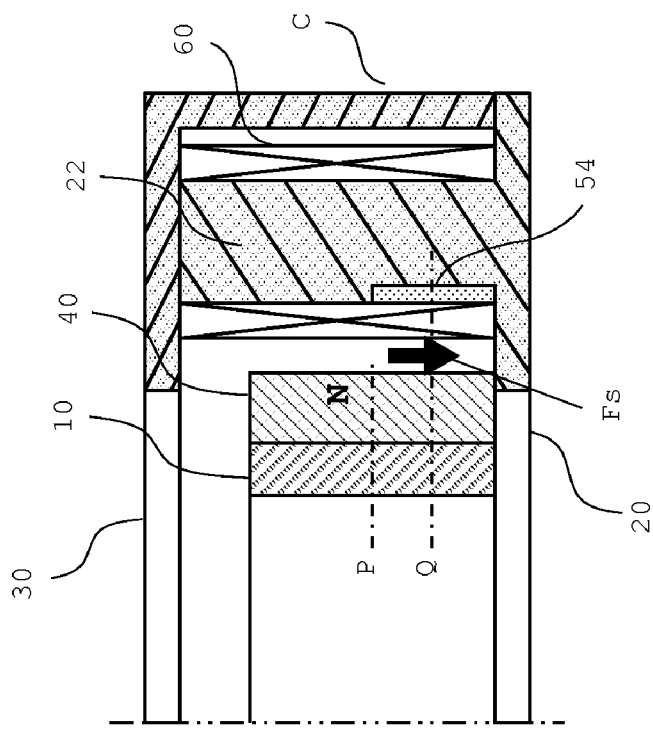

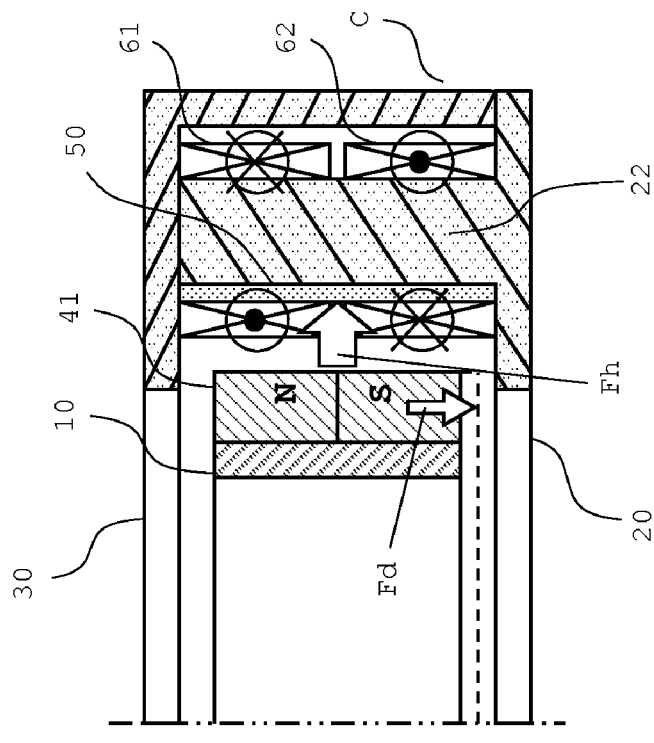
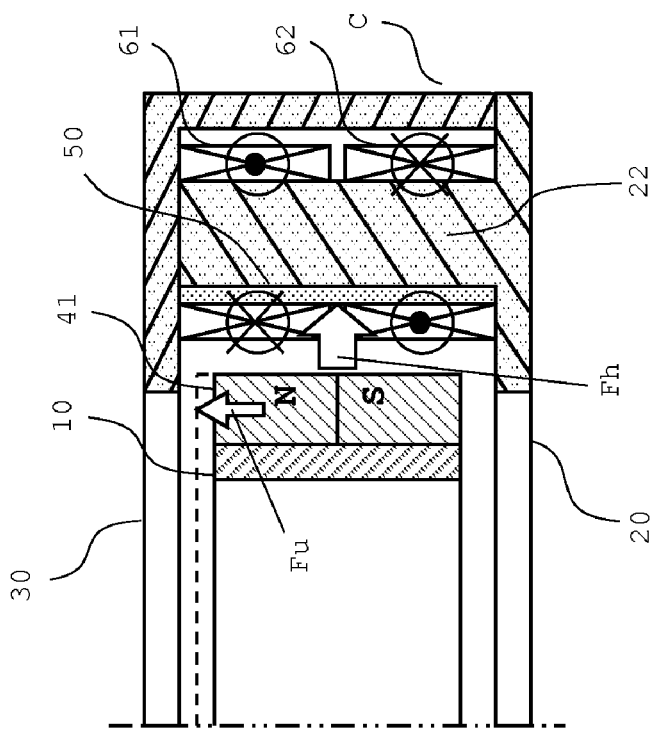
FIG. 8A
FIG. 8B

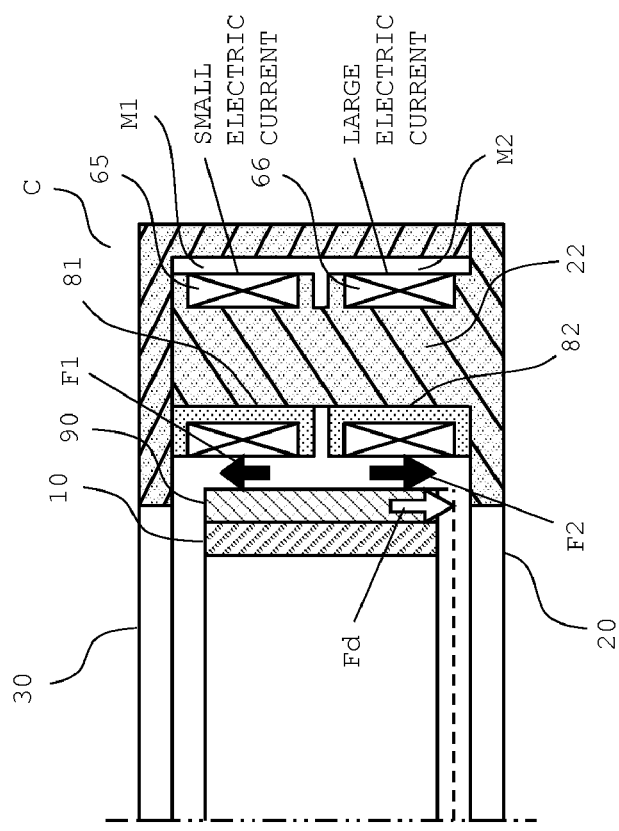
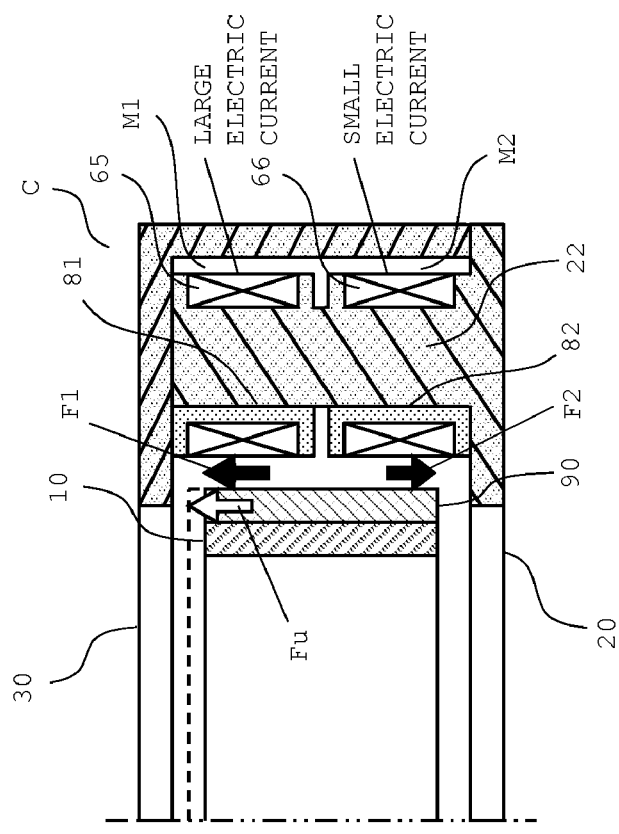
FIG. 11A
FIG. 11B

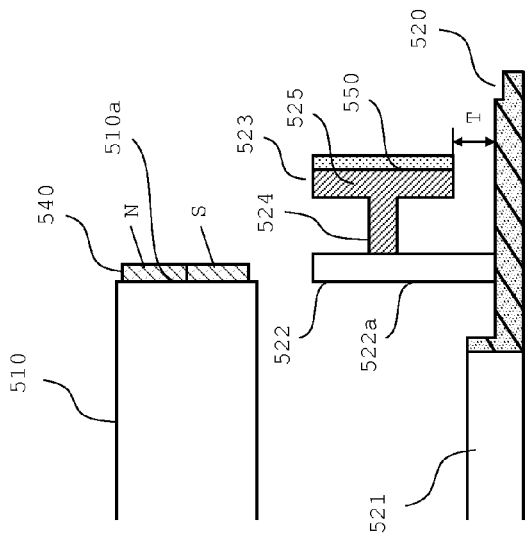
FIG. 13A
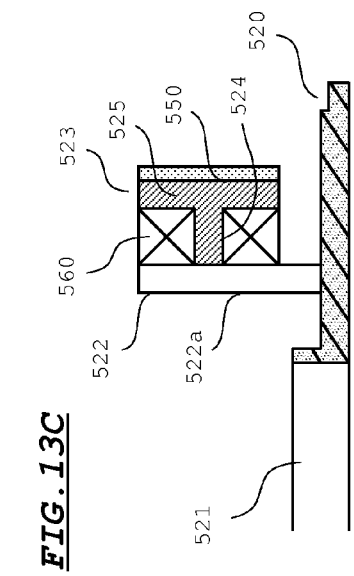
FIG. 13B
FIG. 13C

LENS DRIVE DEVICE

This application claims priority under 35 U.S.C. Section 119 of Japanese Patent Applications No. 2009-77561 filed Mar. 26, 2009, entitled "LENS DRIVE DEVICE", No. 2009-165139 filed Jul. 13, 2009, entitled "LENS DRIVE DEVICE", and No. 2010-34341 filed Feb. 19, 2010, entitled "LENS DRIVE DEVICE". The disclosures of the above applications are incorporated herein by reference.

BACKGROUND OF THE INVENTION

1. Technical Field

The present invention relates to lens drive devices, and in particular, is preferably suitable for use in lens drive devices for focus adjustment incorporated into cameras, camera-equipped cell phones, and others.

2. Description of the Related Art

Conventionally, lens drive devices are incorporated into cameras and others for focus adjustment. Some of those lens drive devices use a magnetic driving force to drive a lens part in a direction of an optical axis. In this case, a magnet is attached to a lens holder, and a coil is attached to a base for retaining the holder, for example. By applying an electric current to the coil, an electromagnetic driving force is generated between the magnet and the coil. This electromagnetic driving force drives the holder in the direction of the optical axis of the lens.

In such a lens drive device, the magnet may be attached to an outer peripheral surface (side surface) of the holder. In addition, the coil is disposed in such a manner as to surround the entire outer periphery of the holder. A box-shaped cabinet covers these holder and coil.

A lens drive device for cell phone or compact camera needs to be reduced in size. However, since the coil is supposed to surround the entire outer periphery of the holder as stated above, it is necessary to secure a space for the coil to be situated between the lens and the holder over the entire periphery. This makes it difficult to downsize the lens drive device in a direction perpendicular to the optical axis of the lens.

SUMMARY OF THE INVENTION

An objective of the present invention is to downsize a lens drive device.

A lens drive device of the present invention includes a holder for holding a lens; a base to which the holder is attached so as to be capable of being displaced in a direction of an optical axis of the lens; and a drive part that displaces the holder using a magnetic driving force in the direction of the optical axis. In this arrangement, the base has an almost square shape in a direction vertical to the optical axis. Further, the drive part is situated in a region between an outer edge of the holder and a corner of the base.

BRIEF DESCRIPTION OF THE DRAWINGS

The foregoing and other objectives and novel features of the present invention will be more fully understood from the following description of preferred embodiments when reference is made to the accompanying drawings.

FIG. 2A shows the uncovered lens drive device; FIG. 2B shows the covered lens drive device; and FIG. 2C shows the columnar part and the vicinity thereof in an enlarged view;

FIGS. 5A to 5E are diagrams showing arrangements of a magnetic member in a modified example 1;

FIGS. 6A and 6B are diagrams describing a driving operation of the lens drive device with the magnetic member of FIG. 5E;

FIGS. 8A and 8B are diagrams describing a driving operation of the lens drive device in the modified example 2;

FIGS. 9A and 9C are cross-section views of a columnar part and the vicinity thereof in the lens drive device; and FIGS. 9B and 9D are diagrams showing a coil and the vicinity thereof as seen from a center of a base;

FIG. 10A shows a columnar part and the vicinity thereof with a lens holder removed; FIG. 10B shows the columnar part and the vicinity thereof with the lens holder attached; and FIG. 10C is a B-B' cross-section view of FIG. 10A;

FIGS. 11A and 11B are diagrams describing a driving operation of the lens drive device in the modified example 4;

FIGS. 12A to 12C show the uncovered lens drive device as seen from above;

FIGS. 13A to 13C are diagrams showing an arrangement of the lens drive device in another embodiment: FIG. 13A is an exploded perspective view of the lens drive device; FIG. 13B is a diagram showing an arrangement of main components on the lens holder and the base; and FIG. 13C is a diagram showing an arrangement of the main components on the base with a coil wound around a bobbin part;

FIGS. 15A and 15C are D-D' cross-section views of FIG. 14; and FIGS. 15B and 15D show the coil and the vicinity thereof as seen from the center of the base;

FIGS. 16A and 16C are perspective views of a corner of the base and the vicinity thereof; and FIGS. 16B and 16D are cross-section views of FIGS. 16A and 16C, respectively;

FIGS. 17A and 17B are perspective views of the corner of the base and the vicinity thereof; and FIGS. 17C to 17E are front views of a guide.

However, the drawings are intended only for illustration, and do not limit the scope of the present invention.

DESCRIPTION OF PREFERRED EMBODIMENTS

Preferred embodiments of the present invention will be described below with reference to the drawings.

Figure 1B:
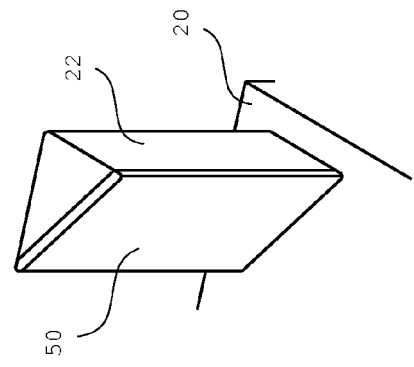
FIGS. 1B and 1C are enlarged perspective views of a columnar part and the vicinity thereof in the embodiment.
Figure 1C:
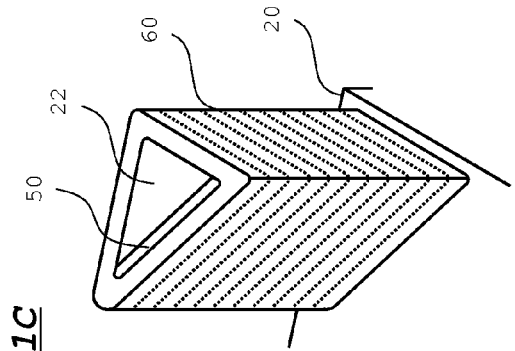
Figure 1A:
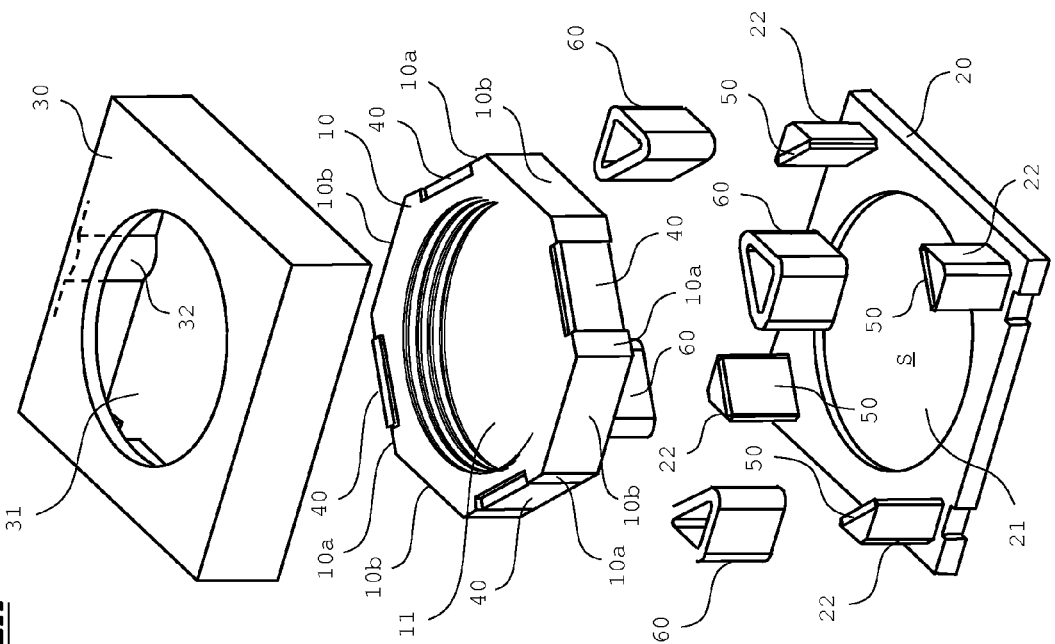
FIG. 1A is an exploded perspective view showing an arrangement of a lens drive device in an embodiment of the present invention.

FIGS. 1A to 1C are diagrams showing an arrangement of a lens drive device: FIG. 1A is an exploded perspective view of the lens drive device; FIG. 1B is an enlarged perspective view of a columnar part 22 on a base 20; and FIG. 1C is an enlarged perspective view of the columnar part 22 with a coil 60.

Referring to FIGS. 1A to 1C, the lens drive device includes a lens holder 10 for holding a lens barrel; the base 20 to which the lens holder 10 is attached; and a cover 30 for covering the lens holder 10. The lens holder 10, the base 20, and the cover 30 are formed of plastic materials, for example.

The lens holder 10 is shaped into an octagon in a planer view. The lens holder 10 is provided with a circular opening 11 at a center thereof for accommodating the lens barrel. The lens holder 10 has eight side surfaces that are symmetric to an optical axis of the lens fitted into the opening 11. Among these eight side surfaces, four side surfaces 10a opposed to corners of the base 20 include respective magnets 40. These four magnets 40 may be sintered magnets made of ferrite or the like, for example, and have a single-pole structure with N and S poles on inner and outer sides, respectively. The magnets 40 are integrated into the lens holder 10 by insert molding, for example. The magnets 40 are equal in size and magnetic intensity.

The base 20 is shaped into an almost square plate. The base 20 has an opening 21 to guide light having passed through the lens toward an image sensor unit.

In addition, the base 20 includes protruding columnar parts 22 at four corners. Each of the columnar parts 22 is shaped into an almost triangular prism. A space enclosed by the four columnar parts 22 constitutes a space S for accommodating the lens holder 10.

The columnar parts 22 have respective magnetic members 50 on inward sides thereof. The magnetic members 50 may be identical in size to the side surfaces of the columnar parts 22, for example. The magnetic members 50 are integrated into the columnar parts 22 by insert molding, for example. In addition, the columnar parts 22 have respective coils 60 attached thereto.

The cover 30 is a thin square case opened downward. The cover 30 has an opening 31 on an upper surface for letting light into the lens. In addition, the cover 30 has projections 32 on undersides of four side surfaces. The projections 32 act as guides for movement of the lens holder 10. Specifically, when the lens drive device is assembled, four side surfaces 10b of the lens holder 10 with no magnets 40 are brought into contact with the corresponding projections 32, thereby to control front-to-back and side-to-side movements of the holder 10. FIG. 1A illustrates only the projection 32 on one side surface.

Figure 2B:
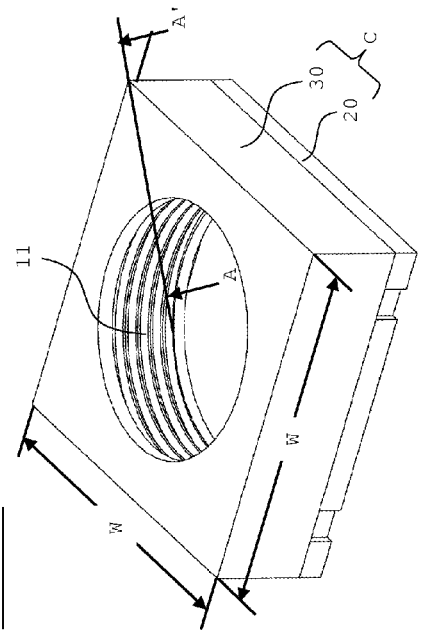
FIGS. 2A, 2B, and 2C are diagrams showing an arrangement of the assembled lens drive device in the embodiment.
Figure 2A:
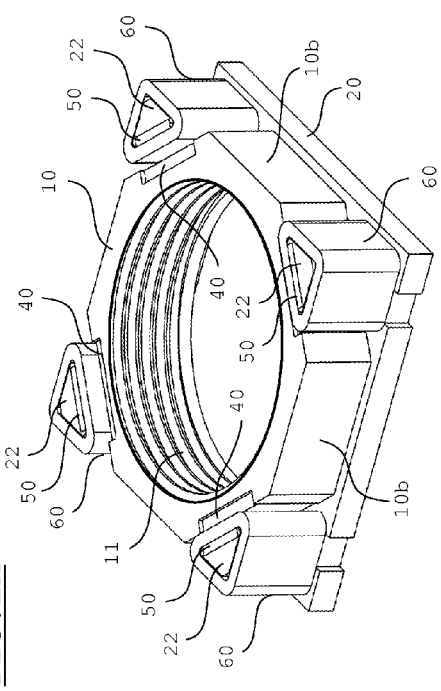
Figure 2C:
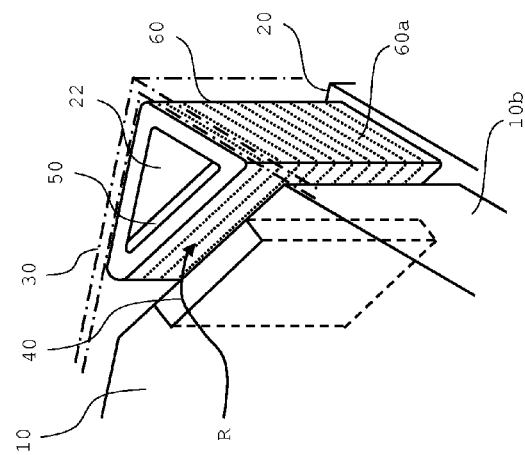

FIGS. 2A to 2C show an arrangement of the assembled lens drive device: FIG. 2A is a perspective view of the lens drive device without the cover 30; FIG. 2B is a perspective view of the completely assembled lens drive device; and FIG. 2C is an enlarged perspective view of the drive part.

In the assembled lens drive device, the coils 60 are attached to the columnar parts 22, and the lens holder 10 is fitted from above into the accommodation space S of the base 20. In this state, the four magnets 40 are opposed to the corresponding coils 60 with predetermined clearances therebetween. In addition, the four magnets 40 are also opposed to the corresponding magnetic members 50. Although not illustrated, a lens barrel is fitted in advance into the opening 11 of the lens holder 10.

Afterward, the cover 30 is attached to the base 20 from above. The base 20 and the cover 30 constitute a square box-shaped cabinet C. The lens holder 10 is placed in the cabinet C so as to be capable of being displaced along the projections 32. In this manner, the lens drive device is completely assembled as shown in FIG. 2B.

The magnets 40, the magnetic members 50, and the coils 60 constitute drive parts for driving the lens holder 10. Here, as shown in FIG. 2C, the magnetic member 50 and the coil 60 are situated in an almost triangular region R formed by the side surfaces 10a of the holder 10 and the corner of the cabinet C. Accordingly, the cabinet C can be reduced in a widthwise dimension required for placement of the magnetic members 50 and the coils 60. In particular, when two surfaces 60a of the coil 60 facing the cover 30 are made flush with or placed on insides of the side surfaces 10b of the holder 10, the coil 60 can be accommodated in a region where the four side surfaces 10b are extended longitudinally. This eliminates the need to widen the cover 30 for storing a part of the coil 60 bulging out of this region. In this embodiment, the two surfaces 60a of the coil 60 are made almost flush with the side surfaces 10b of the holder 10.

Therefore, in this embodiment, if a lens barrel of the same diameter as a conventional one is to be held, a width W of the cabinet C can be reduced to downsize the lens drive device. Meanwhile, if the cabinet C is the same in size as a conventional one, the cabinet C is capable of holding a larger lens barrel.

Figure 3A:
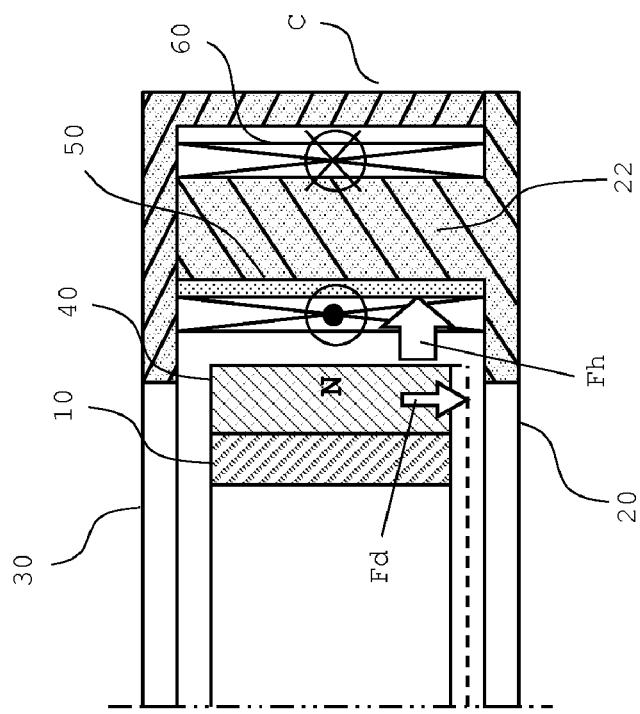
FIGS. 3A and 3B are diagrams for describing a driving operation of the lens drive device in the embodiment.
Figure 3B:
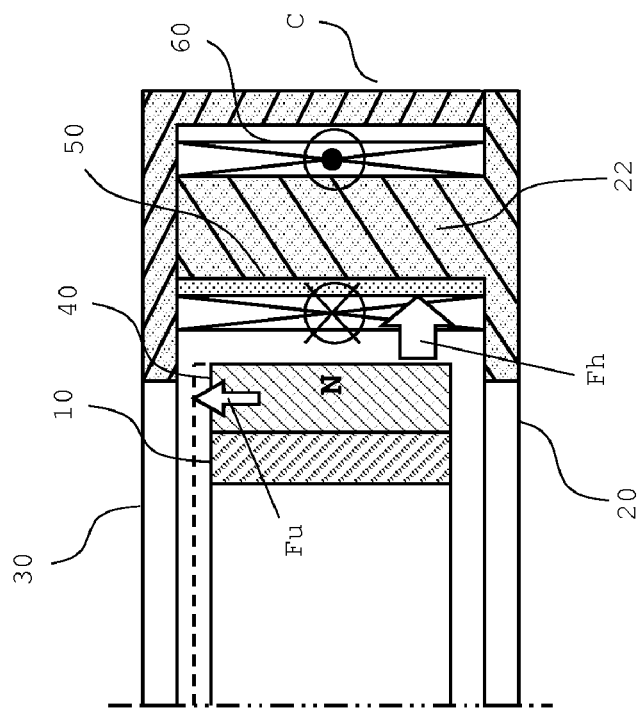

FIGS. 3A and 3B describe a driving operation of the lens drive device. FIGS. 3A and 3B are A-A' cross-section views of FIG. 2B.

FIG. 3A shows that an upward driving force (propulsive force) is acting on the lens holder 10; and FIG. 3B shows that a downward driving force (propulsive force) is acting on the lens holder 10. In each of the diagrams, a symbol of a black dot in a circle and a symbol of a cross in a circle refer to directions in which an electrical current flows. Specifically, the black dot-in-circle symbol indicates a direction approaching toward a diagram viewer, and the cross-in-circle symbol indicates a direction moving away from a diagram viewer. The indications of these symbols also apply to other drawings.

As illustrated, the coil 60 is opposed to an N-polarized region of the magnet 40. When an electric current flows into the coil 60 in the direction shown in FIG. 3A, an upward propulsive force Fu shown in the diagram acts on the magnet 40 to displace the lens holder 10 in the upward direction shown in the diagram. Meanwhile, when an electric current flows into the coil 60 in the direction shown in FIG. 3B, a downward propulsive force Fd in the diagram acts on the magnet 40 to displace the lens holder 10 in the downward direction shown in the diagram. At that time, the magnetic member 50 acts as a yoke to enhance a magnetic field ranging from the magnet 40 toward the coil 60, thereby producing increased propulsive force with respect to the lens holder 10.

When the lens holder 10 is displaced in the upward or downward direction as stated above, the lens is situated in a focused position. A home position of the lens holder 10 can be set as appropriate at a position where the lens holder 10 contacts the base 20, a center of the cabinet C, or others.

In this embodiment, the magnetic member 50 is made longer than the magnet 40 in the direction of the optical axis. Accordingly, the lens holder 10 is subjected to attractive forces Fh from four directions that are perpendicular to the direction of the optical axis and opposite to each other, by magnetic forces between the magnets 40 and the magnetic members 50. Under these four attractive forces Fh, the lens holder 10 is seemingly suspended from the surrounding four directions. Therefore, even if the lens holder 10 is moved in a vertical direction, the lens holder is less affected by the force of gravity, which causes less differences between downward and upward driving operations (in a starting speed, drive response, and the like). Accordingly, the lens holder 10 can be smoothly driven even if the lens drive device is used while the lens holder 10 is moved in the vertical direction.

In addition, when the lens holder 10 is situated in a focused position or home position, the four attractive forces Fh retain the lens holder 10 in that position even if the coils 60 are not energized. That is, the coils 60 can be de-energized at stoppage of the lens holder 10, thereby saving power consumption.

Figure 4:
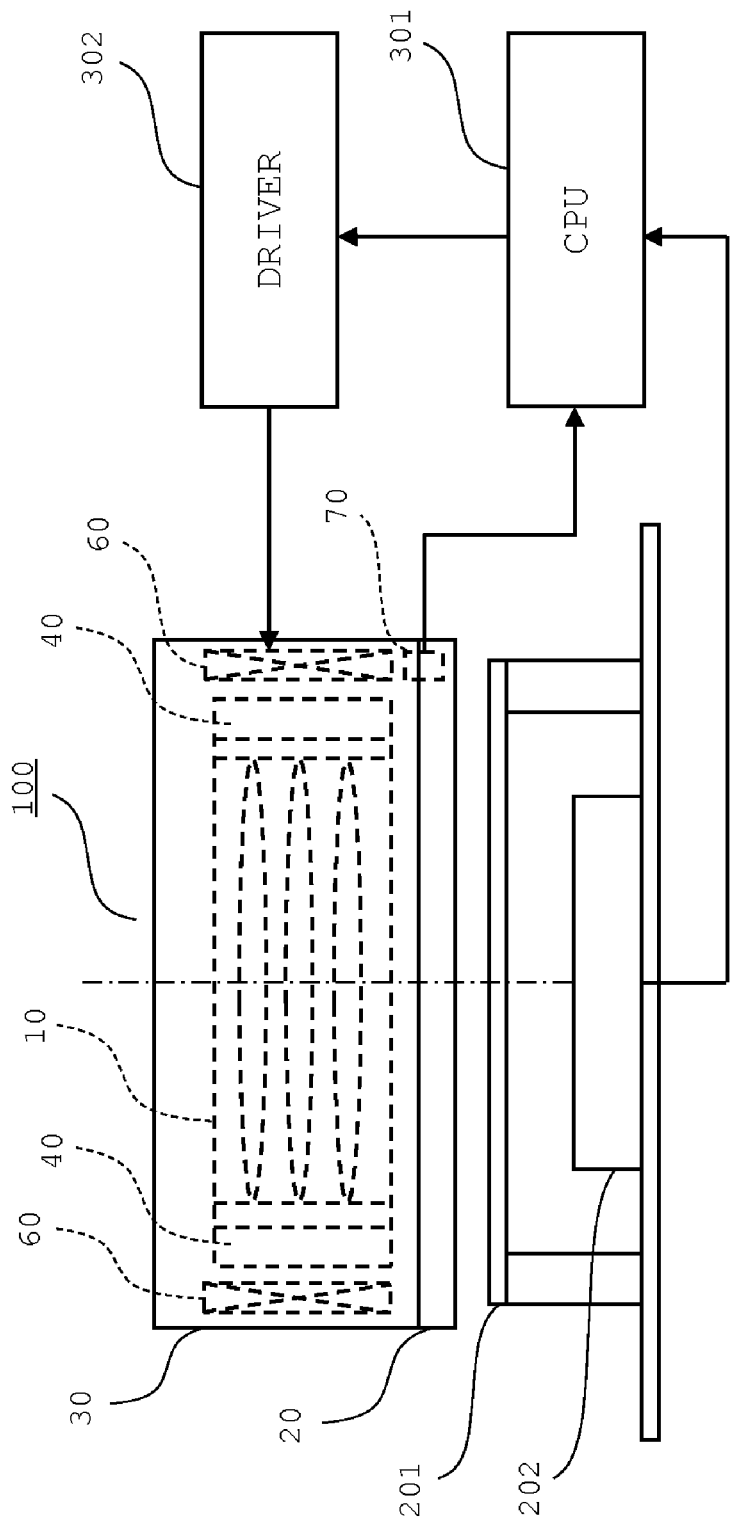
FIG. 4 is a diagram schematically showing an arrangement of a camera module of a camera equipped with the lens drive device of the present invention.

FIG. 4 is a schematic diagram showing a camera module of a camera equipped with the lens drive device 100 in this embodiment.

The base 20 has a filter 201 and an image sensor 202 on an underside thereof. The base 20 also has a hall element 70 as a position sensor. A position of the lens holder 10 is detected in accordance with a signal from the hall element 70.

At a focusing operation, a central processing unit (CPU) 301 controls a driver 302 to displace the lens holder 10 from the home position to a predetermined position in the direction of the optical axis of the lens. At that time, the CPU 301 receives a position detection signal from the hall element 70. Simultaneously, the CPU 301 processes a signal from the image sensor 202 to obtain a contrast value of a shot image. In addition, the CPU 301 acquires a position of the lens holder 10 with a best contrast value as a focused position.

Subsequently, the CPU 301 drives the lens holder 10 toward the focused position. At the time, the CPU 301 monitors signals from the hall element 70, and drives the lens holder 10 until any signal from the hall element 70 corresponds to the focused position. Accordingly, the lens holder 10 is situated in the focused position.

Modified Example 1

Modified Arrangements of the Magnetic Member

FIGS. 5A to 5E show modified examples of arrangements of the magnetic member 50. The modified examples shown in FIGS. 5A to 5E are identical to the foregoing embodiment, except for an arrangement of the magnetic members.

In the foregoing embodiment, the magnetic member 50 is arranged on the inner side surface of the columnar part 22. Alternatively, a magnetic member 51 may be arranged within the columnar part 22, as shown in FIG. 5A. Further alternatively, the magnetic member 52 may be L letter-shaped and straddle two outer side surfaces of the columnar part 22, as shown in FIG. 5B. Still further alternatively, the L-shaped magnetic member 52 may be arranged on a corner of the cover 30, as shown in FIG. 5C. The arrangements of FIGS. 5A to 5C have different clearances between the magnet 40 and the magnetic member 50 and thus generate varying attractive forces Fh between those components. If the clearance is small and the attractive force Fh is large, the lens holder 10 is held by a larger force which but constitutes a resistance to a propulsive force. Accordingly, the attractive force Fh can be regulated by adjusting the position of the magnetic member 50 as appropriate in such a manner as stated above.

Alternatively, a magnetic member 53 may constitute a columnar part as shown in FIG. 5D. In this case, the magnetic member 53 is integrated into the base 20 by insert molding, for example. Otherwise, the base 20 may be made by a magnetic material to be integrated with the magnetic member 53. By constituting the columnar part from the magnetic member 53 as stated above, it is possible to enhance a magnetic field ranging from the magnet 40 to the coil 60, thereby increasing a propulsive force toward the lens holder 10.

Further alternatively, a magnetic member 54, shorter than the magnet 40 in the direction of the optical axis, may be disposed on the columnar part 22, as shown in FIG. 5E. In this modified example, the magnetic member 54 is placed on a lower portion of the columnar part 22.

FIGS. 6A and 6B describe a driving operation of the lens drive device with the use of the magnetic member of FIG. 5E.

In this lens drive device, the lens holder 10 is in contact with the base 20 at a home position thereof. As shown in FIG. 6A, when the lens holder 10 is in the home position, a center Q of the magnetic member 54 is located nearer the base 20 than a center P of the magnet 40.

If the magnetic member 54 is shorter than the magnet 40, the magnet 40 is attracted toward the center Q of the magnetic member 54. Therefore, the lens holder 10 is subjected to both an attractive force toward the magnetic member 54 and an attractive force Fs toward the base 20. Specifically, the lens holder 10 is subjected to the magnetic spring force Fs in the direction of the optical axis. While the coils 60 are not energized, the magnetic spring forces Fs hold the lens holder 10 in the home position.

When an electric current flows into the coil 60 in the direction shown in FIG. 6B, an upward propulsive force Fu acts on the magnet 40 as shown in the diagram. If an electric current flows so as to make the propulsive force Fu larger than the magnetic spring force Fs, the lens holder 10 is displaced in the upward direction shown in the diagram. In addition, if an electric current flows so as to make the propulsive force Fu balanced with the magnetic spring force Fs, the lens holder 10 is brought to a stop. In this state, if an electric current flows so as to make the propulsive force Fu smaller than the magnetic spring force Fs, the lens holder 10 is displaced in the downward direction shown in the diagram.

In actuality, the lens holder 10 is affected by the force of gravity depending on an orientation of the lens drive device. Accordingly, for example, if the lens drive device is oriented downward (the base 20 is located on an upper side), when the resultant of the propulsive forces Fu and the gravity force becomes larger than the magnetic spring forces Fs, the lens holder 10 is displaced downward. Meanwhile, in the lens drive device oriented upward (the base 20 is located on a lower side), if the propulsive forces Fu becomes larger than the resultant of the gravity force and the magnetic spring forces Fs, the lens holder 10 is displaced upward.

As stated above, the lens holder 10 can be moved by regulating amounts of electric currents flowing into the coils 60. In addition, the lens holder 10 can be situated in a predetermined position by balancing forces in the Fu direction (the propulsive force Fu and the resultant of the same and the gravity force) with forces in a direction opposed to the Fu direction (the magnetic spring force Fs and the resultant of the same and the gravity force). Therefore, the lens holder 10 can be stopped and held in the focused position by regulating amounts of electric currents flowing into the coils 60.

In the modified example of FIG. 5E, the magnetic spring force Fs acts on the displacement direction of the lens holder 10 as stated above. It is therefore possible to realize an arrangement similar to a voice coil-type lens drive device in which the lens holder 10 is held by the use of springs. This allows the lens drive device to be driven using a driver of a voice coil-type lens drive device.

Modified Example 2

Figure 7B:
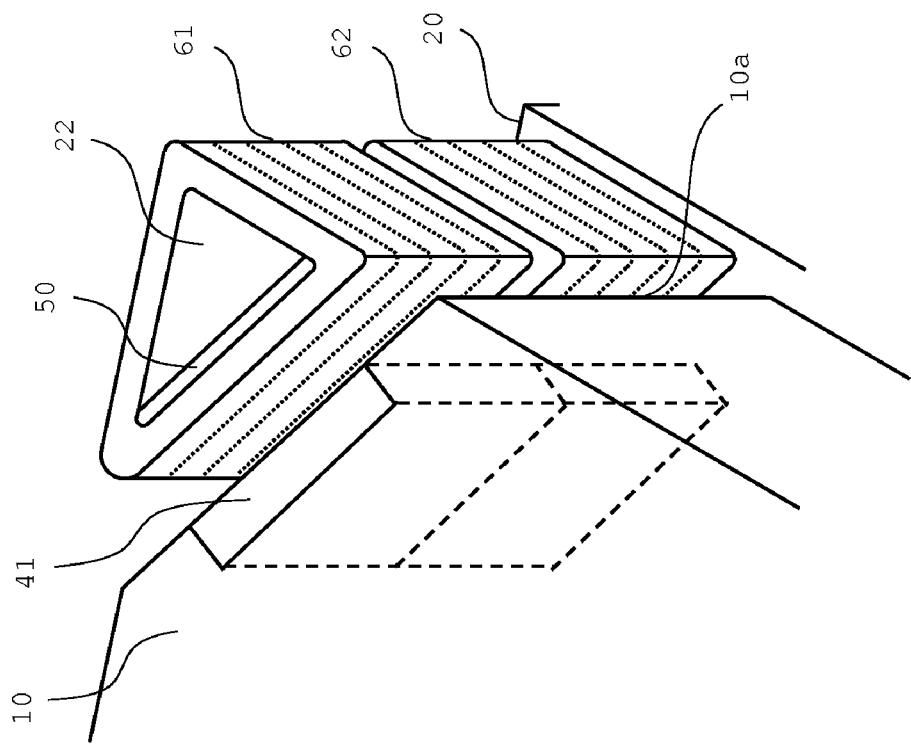
FIGS. 7A and 7B are diagrams showing an arrangement of a columnar part and the vicinity thereof in a lens drive device of a modified example 2.
Figure 7A:
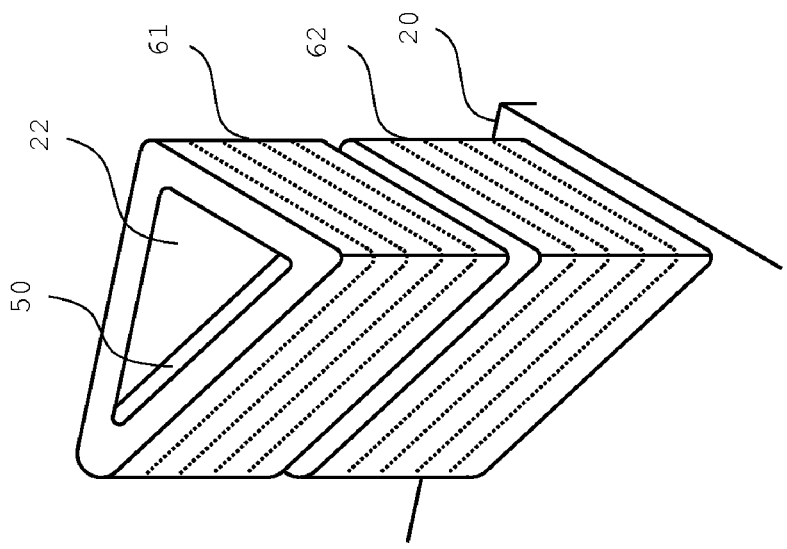

Arrangement of a Drive Part Having a Magnet with a Single-Side Bipolar Structure FIGS. 7A and 7B are diagrams showing an arrangement of a lens drive device in a modified example 2: FIG. 7A shows that a first coil 61 and a second coil 62 are attached to the columnar part 22; and FIG. 7B shows that the lens holder 10 is attached to the base 20.

In the arrangement of the modified example 2, magnets 41 are disposed on the four side surfaces 10a of the lens holder 10. Each of the magnets 41 has a bipolar structure with N and S poles on a single side.

Meanwhile, each of the four columnar parts 22 has the first coil 61 and the second coil 62. The first coil 61 and the second coil 62 are connected in series and wound in mutually reverse directions. Accordingly, electric currents flow into the first coil 61 and the second coil 62 in mutually reversed direction. N and S polarized regions on the magnet 41 are opposed to the first coil 61 and the second coil 62, respectively.

This modified example is identical to the foregoing embodiment except for the foregoing arrangement.

FIGS. 8A and 8B describe a driving operation of the lens drive device in the modified example 2.

When an electric current flows into the first coil 61 and the second coil 62 in a direction shown in FIG. 8A, an upward propulsive force Fu shown in the diagram acts on the magnet 41 to displace the lens holder 10 in the upward direction shown in the diagram. Meanwhile, when an electric current flows into the first coil 61 and the second coil 62 in a direction shown in FIG. 8B, a downward propulsive force Fd shown in the diagram acts on the magnet 41 to displace the lens holder 10 in the downward direction shown in the diagram. At that time, the magnetic member 50 functions as a yoke to enhance a magnetic field penetrating through the first coil 61 and the second coil 62, thereby increasing a propulsive force toward the lens holder 10.

By displacing the lens holder 10 in the upward or downward directions as stated above, the lens holder 10 can be situated in the focused position. The home position of the lens holder 10 can be set at any appropriate position, such as a position where the lens holder 10 contacts the base 20, the center of the cabinet C, and others.

In this modified example, the lens holder 10 is also subjected to attractive forces Fh from four directions that are perpendicular to the direction of the optical axis and opposed to each other, by magnetic forces between the magnets 41 and the magnetic members 50. Accordingly, the lens holder 10 can be driven smoothly even if the lens drive device is used while the lens holder 10 is moved in the vertical direction. In addition, the lens holder 10 can be held in the focused position or the home position even if the first coil 61 and the second coil 62 are not energized.

Modified Example 3

Figure 9B:
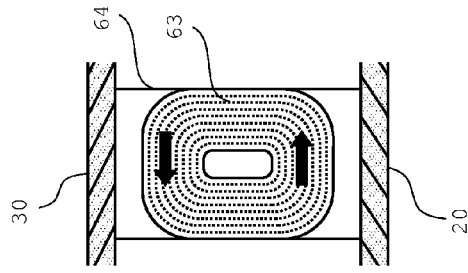
FIGS. 9A to 9D are diagrams showing an arrangement and a driving operation of a lens drive device in a modified example 3.
Figure 9A:
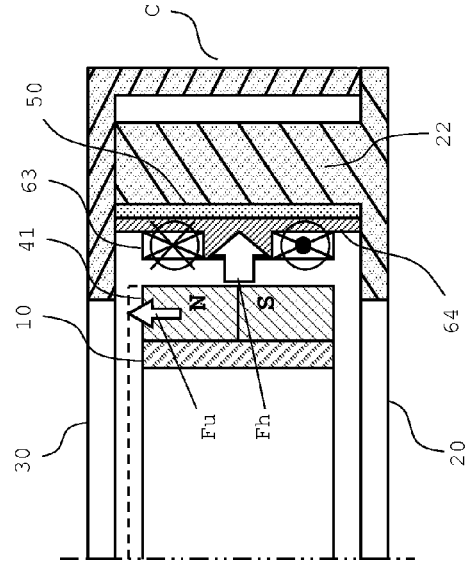
Figure 9D:
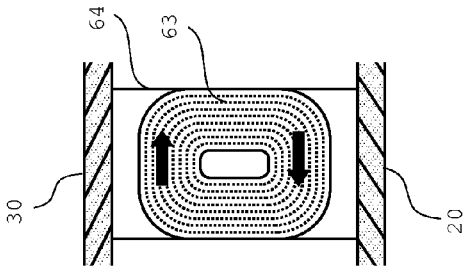
Figure 9C:
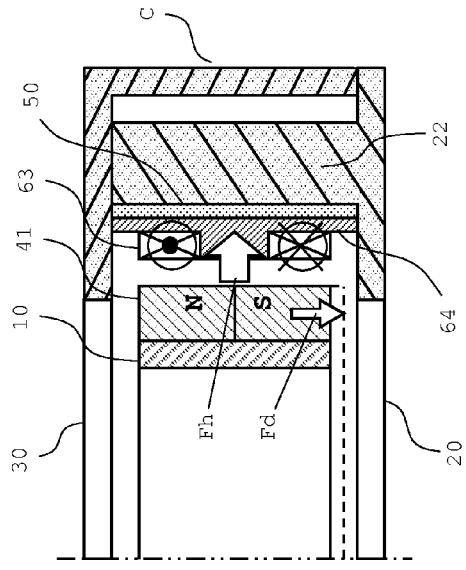

Another Arrangement of the Drive Part Having a Magnet with a Single-Side Bipolar Structure FIGS. 9A to 9D are diagrams showing an arrangement and a driving operation of the lens drive device in the modified example 3: FIGS. 9A and 9C are cross-section views of the lens drive device; and FIGS. 9B and 9D are front views of a coil 63. Each of black arrows in FIGS. 9B and 9D indicates a direction of an electric current flowing into the coil 63.

The arrangement of the modified example 3 includes the coils 63 that are wound in a track-like form parallel to inner side surfaces of the columnar parts 22, instead of the first coils 61 and the second coils 62 of the modified example 2. The coils 63 are each wound around bobbin members 64. The bobbin members 64 are each attached to the magnetic members 50. N and S polarized regions on the magnet 41 are opposed to upper and lower parts of the coil 63, respectively. Alternatively, the bobbin members 64 may be omitted such that the coils 63 are fixed with resin and attached directly to surfaces of the magnetic members 50 opposed to the magnets 41.

This modified example is identical to the foregoing embodiment, except for the above-mentioned arrangement.

When an electric current flows into the coil 63 in the direction shown in FIGS. 9A and 9B, an upward propulsive force Fu shown in the diagram acts on the magnet 41 to displace the lens holder 10 in the upward direction shown in the diagram. Meanwhile, when an electric current flows into the coil 63 in the direction shown in FIGS. 9C and 9D, a downward propulsive force Fd shown in the diagram acts on the magnet 41 to displace the lens holder 10 in the downward direction shown in the diagram. At that time, the magnetic member 50 functions as a yoke to enhance a magnetic field penetrating through the coils 63, thereby increasing a propulsive force toward the lens holder 10.

In this manner, the lens can be situated in the focused position by displacing the lens holder 10 in the upward or downward direction as stated above. The home position of the lens holder 10 can be set at any appropriate position, such as a position where the lens holder 10 contacts the base 20, a center of the cabinet C, or the like.

In this modified example, the lens holder 10 is subjected to attractive forces Fh from four directions that are perpendicular to the direction of the optical axis and opposed to each other by magnetic forces between the magnets 41 and the magnetic members 50, as in the foregoing embodiment and the modified example 2. Accordingly, the lens holder 10 can be driven smoothly even if the lens drive device is used while the lens holder 10 is moved in the vertical direction. In addition, the lens holder 10 can be held in the focused position or home position even if the coils 63 are not energized.

The foregoing arrangements of the magnetic member of the modified examples 1 shown in FIGS. 5A to 5E can be applied to the lens drive devices in the foregoing modified examples 2 and 3. However, if the magnetic members are made shorter than the magnets as shown in FIG. 5E, the same driving operation is performed as described above with reference to FIGS. 6A and 6B. Specifically, the lens holder 10 can be stopped in the focused position by regulating amounts of electric currents flowing into the first coils 61 and second coils 62 (in the modified example 2) or the coils 63 (in the modified example 3) with respect to the magnetic spring force Fs acting on the lens holder 10 (refer to FIGS. 6A and 6B). After that, the lens holder 10 can be held in that position by continuously energizing the coils.

Modified Example 4

Arrangement of the Drive Part Using an Electric Magnet

Figure 10B:
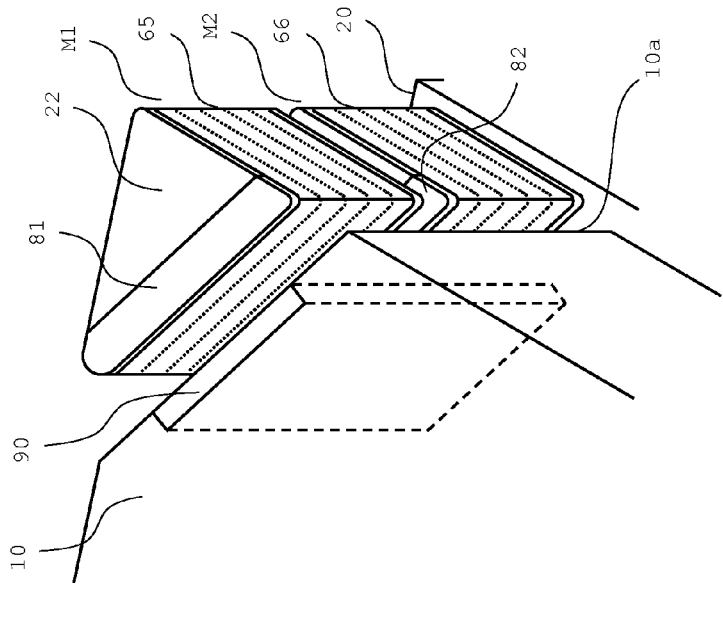
FIGS. 10A to 10C are diagrams showing an arrangement of a lens drive device in a modified example 4.
Figure 10A:
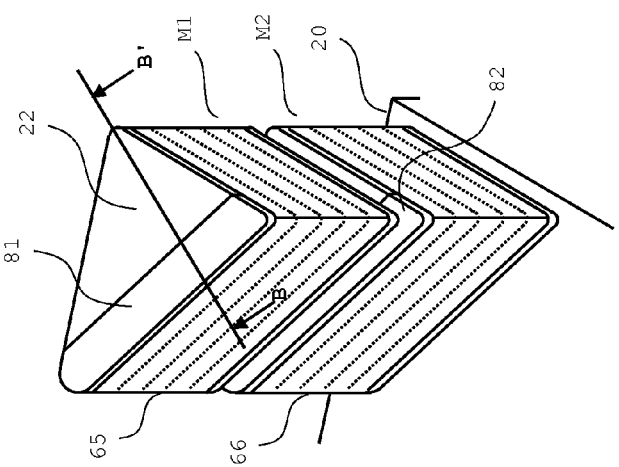
Figure 10C:
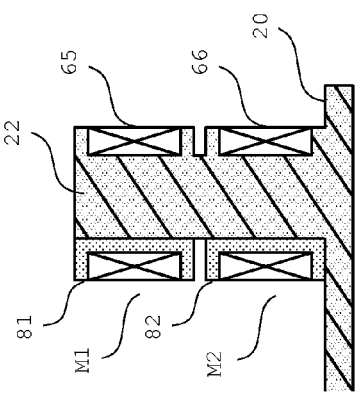

FIGS. 10A to 10C are diagrams showing an arrangement of the lens drive device in a modified example 4: FIG. 10A shows that the columnar part 22 has an electric magnet; FIG.

10B shows that the lens holder 10 is attached to the base 20; and FIG. 10C is a B-B' cross-section view of FIG. 10A.

In the arrangement of the modified example 4, the lens holder 10 has magnetic plates 90 on the four side surfaces 10a thereof. Meanwhile, each of the columnar parts 22 has a first electric magnet M1 and a second electric magnet M2 on the upper and lower sides shown in the diagram.

The first electric magnet M1 has a first yoke 81 disposed on an upper side surface of the columnar part 22, and a first coil 65 wound around the first yoke 81 and an upper part of the columnar part 22. The second electric magnet M2 has a second yoke 82 disposed on a lower side surface of the columnar part 22 and a second coil 66 wound around the second yoke 82 and a lower part of the columnar part 22. The first yoke 81 and the second yoke 82 are integrated into the columnar part 22 by insert molding, for example. Electric currents are applied from a driver (not shown) separately to the first coil 65 and the second coil 66.

In this modified example, the first yoke 81 and the second yoke 82 have the same arrangement as those of the first coil 65 and the second coil 66. When electric currents of the same magnitude flow into the first electric magnet M1 and the second electric magnet M2, those magnets generate equal magnetic forces (attractive forces).

The modified example 4 is identical in arrangement to the foregoing embodiment, except for the arrangement described above.

FIGS. 11A and 11B are diagrams for describing a driving operation of the lens drive device in the modified example 4.

In this modified example, the home position of the lens holder 10 is set at the center of the cabinet C, for example. Assuming that no gravity force is applied in a direction of movement of the lens holder 10, when the lens holder 10 is in the home position, electric currents of the same magnitude flow into the first coil 65 and the second coil 66. In this case, the lens holder 10 is held in the home position because an attractive force F1 generated in the direction of the optical axis by a magnetic force of the electric magnet M1 becomes equal to an attractive force F2 generated in the direction of the optical direction by a magnetic force of the electric magnet M2.

In this state, when a larger electric current flows into the first coil 65 than the second coil 66 as shown in FIG. 11A, the attractive force F1 becomes larger than the attractive force F2, and thus the upward propulsive force Fu shown in the diagram acts on the magnetic plate 90, thereby to displace the lens holder 10 in the upward direction shown in the diagram.

Meanwhile, when a larger electric current flows into the second coil 66 than the first coil 65 as shown in FIG. 11B, the attractive force F2 becomes larger than the attractive force F1, and thus the downward propulsive force Fd shown in the diagram acts on the magnetic plate 90, thereby to displace the lens holder 10 in the downward direction shown in the diagram.

In this manner, the lens holder 10 can be displaced in the upward or downward direction to be situated in the focused position by regulating amounts of electric currents flowing into the first coils 65 and the second coils 66 as stated above. At that time, the lens holder 10 can be held in the focused position by continuously energizing the first coils 65 and the second coils 66 for holding the lens holder 10 in the focused position.

In this modified example, the lens drive device can be affected by the gravity force depending on an orientation thereof, and therefore electric currents flowing into the first coils 65 and the second coils 66 are also controlled with allowance for the influence of the gravity force.

In this modified example, the lens holder 10 may have magnetic plates, instead of magnets. In general, the magnetic plates can be reduced in thickness than the magnets, thereby thinning the lens holder 10 in the direction of a diameter thereof. Accordingly, the lens holder 10 can be decreased in size and weight.

In consideration of the present invention from an aspect of reducing the lens holder 10 in size and weight by disposing the magnetic plates on the lens holder 10 in this modified example, the drive parts are not necessarily situated in the regions R at the corners of the cabinet C (refer to FIG. 2C). For example, the magnet plates may be attached to the side surfaces 10b of the lens holder 10, and the electric magnets may be placed in positions opposed to the magnetic plates.

<Others>

Figure 12C:
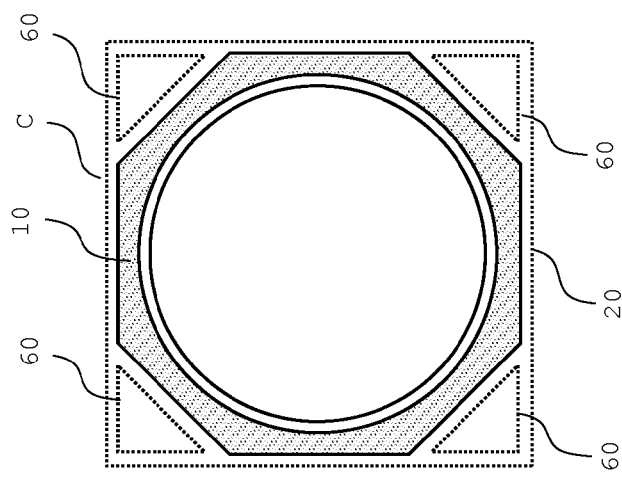
FIGS. 12A to 12C are diagrams describing other modified examples of the lens holder.

In the foregoing embodiment, the lens holder 10 is shaped into an octagon in a planar view. However, the lens holder 10 is not limited to this, and may be made circular in a planar view as shown in FIG. 12A, for example. The lens holder 10 just needs to be formed so as to create almost triangular spaces between the lens holder 10 and the corners of the cabinet C.

In addition, the foregoing embodiment uses sintered magnets for the magnets 40 disposed on the lens holder 10. Alternatively, plastic magnets may be employed for the magnets 40.

Plastic magnets are generally formed by solidifying and molding a magnetic material with plastic, and are smaller in weight than sintered magnets. Therefore, the use of plastic magnets makes it possible to reduce the lens holder 10 in weight and decrease a propulsive force required for driving the lens holder 10.

Figure 12B:
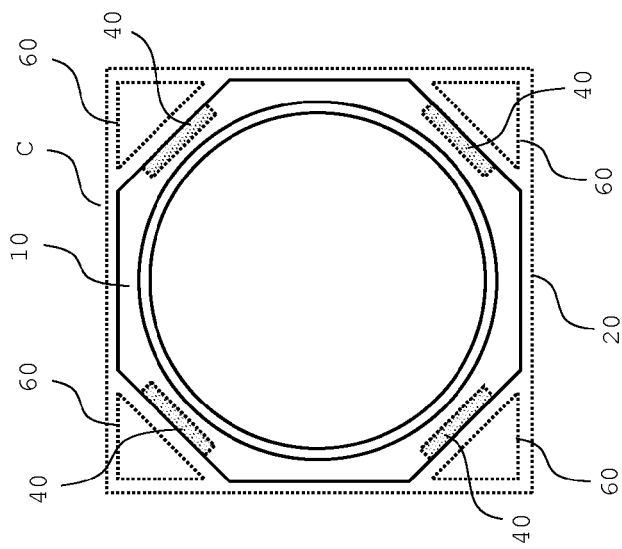
Figure 12A:
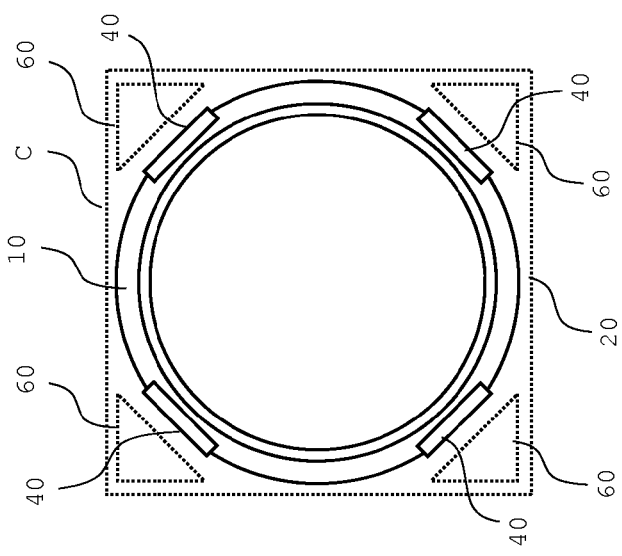

If the lens holder 10 is molded using plastic magnets, a plastic material mixed with a magnetic material is injected into positions of the magnets 40 and is integrated with other parts, as shown in FIG. 12B. Further, the lens holder 10 may be formed as an entire plastic magnet by molding the lens holder 10 of a plastic material mixed with a magnetic material, as shown in FIG. 12C.

Moreover, the magnets 40, the magnets member 50, and the coils 60, constitute the drive parts in the foregoing embodiment. Alternatively, only the magnets 40 and the coils 60 may constitute the drive parts, without the magnetic members 50. In this case, however, magnetic fields penetrating through the coils 60 are weaker as compared with those in the foregoing embodiment. Accordingly, if identical amounts of electric current flow into the coils 60, a propulsive force toward the lens holder 10 is lowered.

In addition, the magnetic members 50 do not need to be provided at all the four corners. However, in disposing the magnetic members 50 at two corners, it is desired that the two magnetic members 50 are diagonally arranged.

Further, in the foregoing embodiment, the drive parts are provided at the four corners of the cabinet C. Alternatively, the drive parts are not necessarily disposed at all the corners as far as the drive parts can assure a significant propulsive force for the lens holder 10. In this case, similarly, when disposing the drive parts at two corners, it is desired that the two drive parts be arranged diagonally.

Another Embodiment

FIGS. 13A to 13C show an arrangement of a lens drive device in another embodiment: FIG. 13A is an exploded perspective view of the lens drive device; FIG. 13B is a diagram showing an arrangement of main components of a lens holder 510 and a base 520; and FIG. 13C is a diagram showing an arrangement of main components of the base 520 in which a coil 560 is wound around a bobbin part 523.

Referring to FIGS. 13A to 13C, the lens drive device includes the lens holder 510 for holding a lens barrel, the base 520 to which the lens holder 510 is attached, and a cover 530 for covering the lens holder 520. The lens holder 510, the base 520, and the cover 530 are made of plastic materials, for example.

The lens holder 510 is shaped into an octagon in a planar view. The lens holder 510 has a circular opening 511 on a center thereof for accommodating the lens barrel. The lens holder 510 has eight side surfaces arranged symmetrically about the optical axis of the lens fitted into the opening 511. Among these eight side surfaces, four side surfaces 510*a* located in the vicinities of corners of the base 520 have respective magnets 540.

The four magnets 540 are sintered magnets made of ferrite, for example, and have a bipolar structure with N and S poles on one side (refer to FIG. 13B). These magnets 540 are integrated into the lens holder 510 by insert molding, for example. Here, the magnets 540 attached to the lens holder 510 slightly project outward than the side surfaces of the lens holder 510 (refer to FIG. 13B). The magnets 540 are equal in size and magnetic intensity.

The base 520 is formed of an almost square plate. The base 520 has an opening 521 to guide light having passed through the lens toward an image sensor unit. In addition, the base 520 also has projecting columnar parts 522 at four corners thereof. Each of the columnar parts 522 is formed by a pair of columns 522*a* between which a clearance (space) is left for accommodating a projecting part of the magnet 540. A space enclosed by the four columnar parts 522 constitutes a space S for accommodating the lens holder 510.

Each of the columnar parts 522 has on an outer side a bobbin part 523 that is integrated with the columnar part 522. The bobbin part 523 has a winding core 524 fixed across the pair of columnar parts 522*a* and has a guide 525 formed at a leading end of the winding core 524. The winding core 524 has a rectangular cross section, and the guide 525 is shaped into a rectangle that is larger in area than the winding core 524.

The coils are wound around the winding cores 524. The guides 525 support outsides of the coils such that the wound coils do not come off outward. For the case of using a winding machine to wind the coil around the winding core 524, a clearance T for insertion of a nozzle end of the winding machine is provided between a lower end of the guide 525 and an upper surface of the base 520 (refer to FIG. 13B). The columnar parts 522 support the bobbin parts 523 with respect to the base 520, and hold inner sides of the coils wound around the winding cores 524.

Magnetic members 550 are disposed on outer surfaces of the guides 525. These magnetic members 550 are sized so as to be identical to outer surfaces of the guides 525, for example. These magnetic members 550 are integrated with the guides 525 (bobbin parts 523) by insert molding, for example.

The cover 530 is a thin square case opened on a lower side, and has the same arrangement as that of the cover 30 in the foregoing embodiment. Specifically, the cover 530 has an opening 531 for letting light into the lens, and has four projections as guides for movement of the lens holder 510. FIG. 13A shows only the projection 531 on one side surface.

When the lens drive device is assembled, the base 520 is firstly set on a winding machine to wind the coils 560 around the bobbin parts 523. For example, a nozzle of the winding machine is inserted from an outside of the base 520 into an outer periphery of the winding core 524. Then, the nozzle moves around the winding core 524 to wind the coil 560 around the winding core 524. At that time, the nozzle passes through the above-mentioned clearance T. Accordingly, the coil 560 is completely wound around the bobbin part 523, as shown in FIG. 13C.

When the coil 560 is attached to the cover 520, then the lens holder 510 is accommodated from above into the accommodation space S of the base 520. Although not illustrated, the lens barrel is attached in advance to the lens holder 510. After the lens holder 510 is accommodated into the base 520, the cover 530 is attached to the base 520 from above. In this manner, the lens drive device is completely assembled. The base 520 and the cover 530 constitute the square box-shaped cabinet C.

Figure 14:
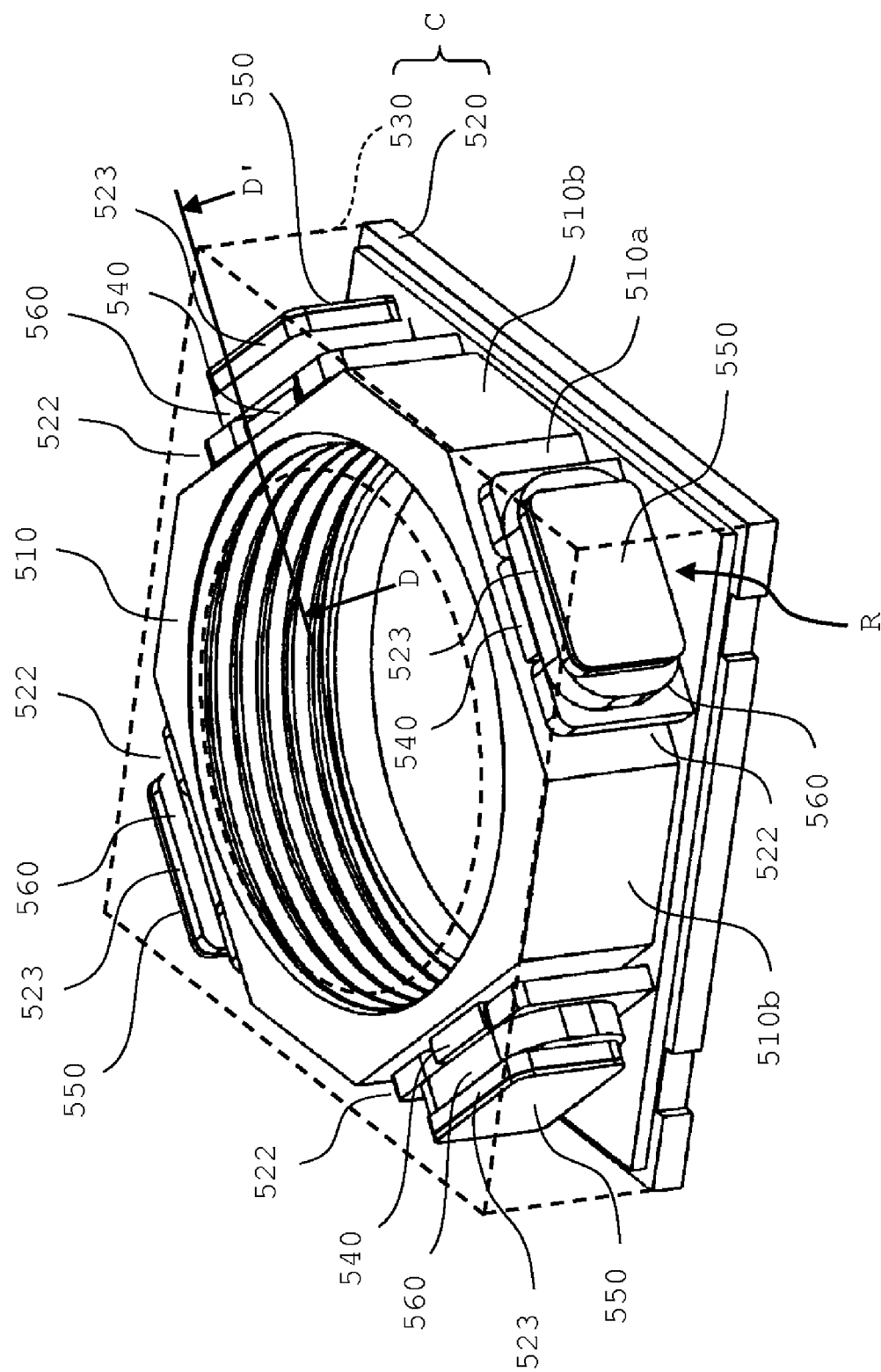
FIG. 14 is a perspective view of an arrangement of the assembled lens drive device in the other embodiment.

FIG. 14 is a diagram (perspective view) showing an arrangement of the assembled lens drive device. In FIG. 14, the cover 530 is shown by dashed lines for the convenience of description.

In the assembled device, the four magnets 540 are placed in clearances on the corresponding columnar parts 522. Accordingly, the magnets 540 face closely the corresponding coils 560. In addition, the magnets 540 are opposed to the corresponding magnetic members 550.

The magnets 540, the magnetic members 550, and the coils 560 constitute drive parts for driving the lens holder 510. In the lens drive device, the drive parts further include the columnar parts 522 and the bobbin parts 523. Here, the magnetic members 550 and the coils 560 are disposed in almost triangular regions R formed by the side surfaces 510*a* of the holder 510 and the corners of the cabinet C, as shown in FIG. 14. Accordingly, the cabinet C can be reduced in a widthwise dimension required for placement of the magnetic members 550 and the coils 560. In particular, when each of the drive parts is disposed so as not to go over a line almost flush with the side surface 510*b* of the lens holder 510, the cover 530 does not need to be widened for accommodating the drive parts. Therefore, the lens drive device is configured such that an end of each of the drive parts is situated on an inner side of a plane almost flush with the side surface 510*b* of the lens holder 510.

Therefore, in another embodiment, the lens drive device can be downsized as in the foregoing embodiment. Otherwise, if the cabinet C of the same size as a conventional one, the cabinet C can hold a larger lens barrel.

In addition, in the lens drive device of the modified example 3 shown in FIGS. 9A to 9D, the bobbin parts 64 are positioned on the inner sides of the columnar parts 22, and thus it is difficult to wind the coils 63 around the bobbin parts 64 using a winding machine.

In this respect, this lens drive device is configured such that the bobbin parts 523 are positioned on the outer sides of the columnar parts 522, which makes it easy to wind the coils 560 around the bobbin parts 523 using a winding machine. Accordingly, the coils 560 can be directly wound around the base 520, which makes it possible to decrease man-hours in a manufacturing process.

Further, in another embodiment, the magnets 540 are accommodated into clearances on the columnar parts 522. Accordingly, the magnets 540 can be made closer to the coils 560, thereby increasing a force for driving the lens holder 510. In addition, the drive parts can be reduced in dimensions to downsize the cabinet C.

Figure 15A:
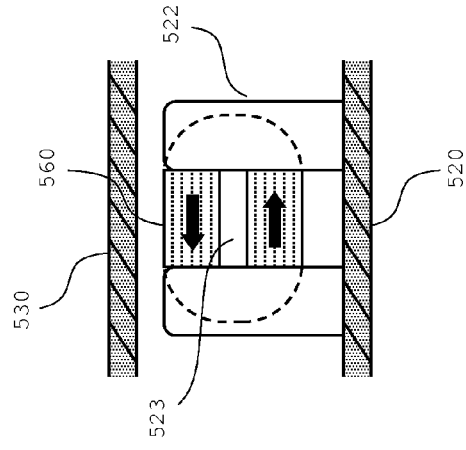
FIGS. 15A to 15D are diagrams for describing a driving operation of the lens drive device in the other embodiment.
Figure 15B:
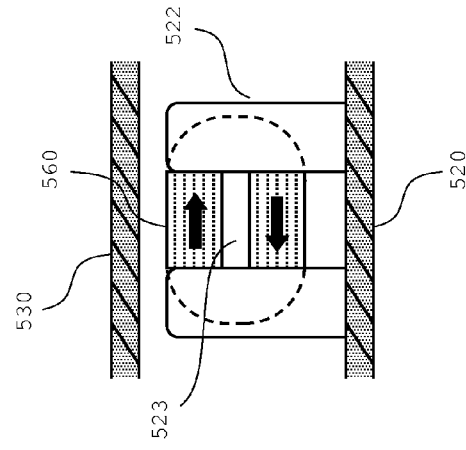
Figure 15C:
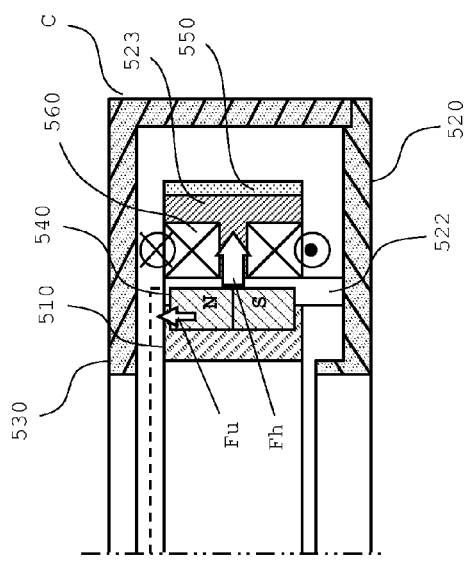
Figure 15D:
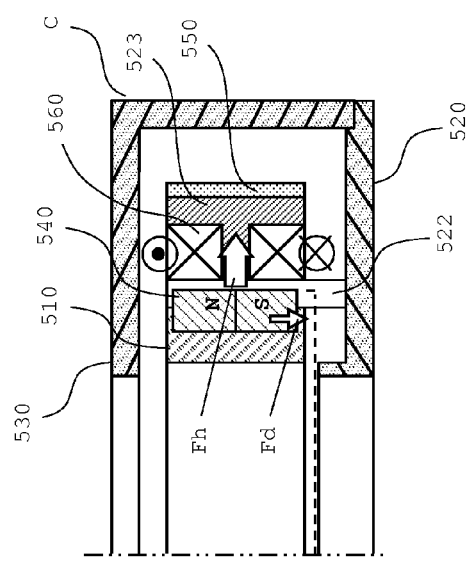

FIGS. 15A to 15D show a driving operation of the lens drive device: FIGS. 15A and 15C are D-D' cross-section views of FIG. 14; and FIGS. 15B and 15D are front views of the coil 560 as seen from the center of the base 520. Each of black arrows in FIGS. 15B and 15D indicates a direction of an electric current flowing into the coil 560.

Each of the coils 560 is wound in a track-like shape parallel to the plane of the magnet 540. N and S polarized regions of the magnet 540 are opposed on upper and lower parts of the coil 560, respectively.

When an electric current flows into the coil 560 in the direction shown in FIGS. 15A and 15B, an upward propulsive force Fu shown in the diagram acts on the magnets 540 to displace the lens holder 510 in the upward direction shown in the diagram. Meanwhile, when an electric current flows into the coil 560 in the direction shown in FIGS. 15C and 15D, a downward propulsive force Fd shown in the diagram acts on the magnets 540 to displace the lens holder 510 in the downward direction shown in the diagram. At that time, each of the magnetic members 550 functions as a yoke to enhance a magnetic field penetrating through the coil 560, thereby increasing a propulsive force toward the lens holder 510.

The lens can be situated in the focused position by displacing the lens holder 510 in the upward or downward direction as stated above. The home position of the lens holder 510 can be set at any appropriate position, such as a position where the lens holder 510 contacts the base 520, the center of the cabinet C, and others.

In this lens drive device, the magnetic members 550 are made longer than the magnets 540 in the direction of the optical axis, as in the foregoing embodiment. Therefore, the lens holder 510 is subject to attractive forces Fh from four directions that are perpendicular to the direction of the optical axis and opposed to each other, by magnetic forces between the magnets 540 and the magnetic members 550. Accordingly, the lens holder 510 can be smoothly driven even if the lens drive device is used while the lens holder 510 is moved in the vertical direction. In addition, the lens holder 510 can be held in the focused position or home position even if the coils 560 are not energized.

Modified Examples 1 of Another Embodiment

FIGS. 16A to 16D and FIGS. 17A to 17E are diagrams for describing modified examples of the lens drive device in another embodiment.

Figure 16B:
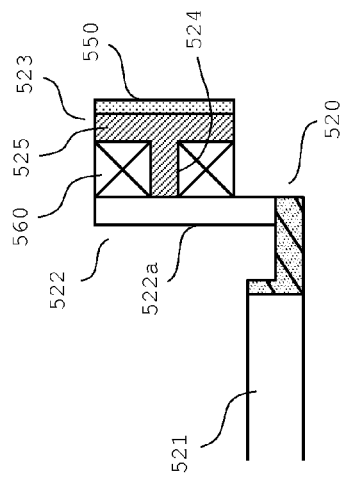
FIGS. 16A to 16D are diagrams showing a lens drive device in a modified example of the other embodiment.
Figure 16D:
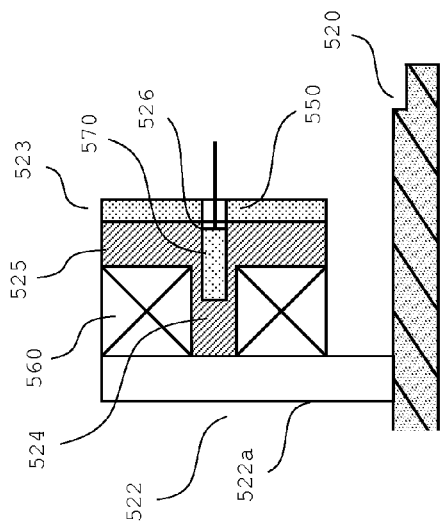
Figure 16A:
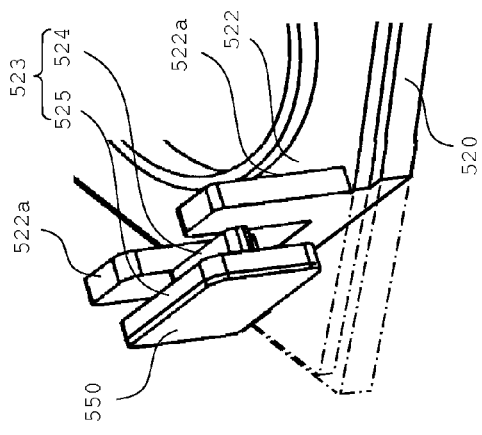

As shown in FIGS. 16A and 16B, the base 520 may be shaped in such a manner that four corners are cut off diagonally on the outer sides of the columnar parts 522. In such an arrangement, the base 520 does not exist under the bobbin parts 523, which decreases limits on size and movement of a nozzle of a winding machine. Accordingly, the winding machine can be used at a higher degree of freedom.

Figure 16C:
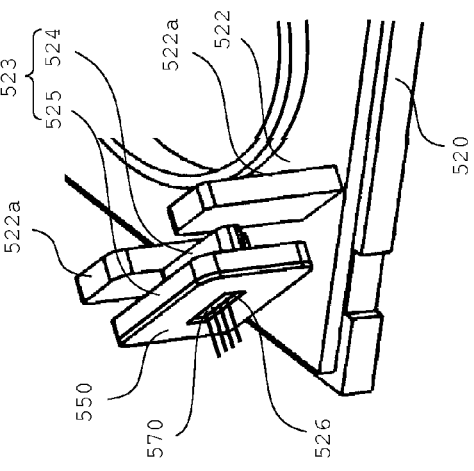

In addition, as shown FIGS. 16C and 16D, an accommodation part 526 can be formed at one of the bobbin parts 523 for accommodating a hall element 570. The accommodation part 526 is adapted to a shape of the hall element 570 from the outer surface of the guide 524 to the inside of the winding core 525.

The hall element 570 is identical to the hall element 70 for position detection described above with reference to FIG. 4. When the lens holder 510 moves vertically, a magnetic field at the location of the hall element 570 changes accordingly, and the hall element 570 outputs a position detection signal in accordance with that change.

In such an arrangement, the hall element 570 as a position sensor can be easily disposed using the bobbin part 523.

Figure 17B:
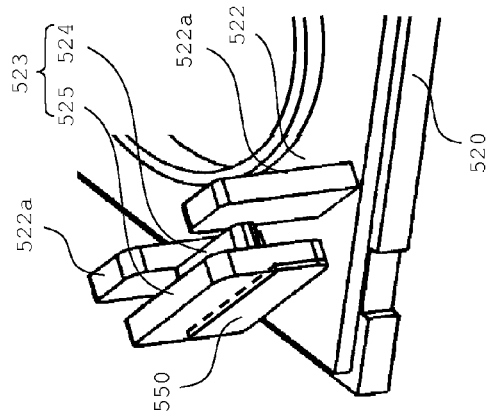
FIGS. 17A to 17E are diagrams showing arrangements of the lens drive device in further modified examples of the other embodiment.
Figure 17A:
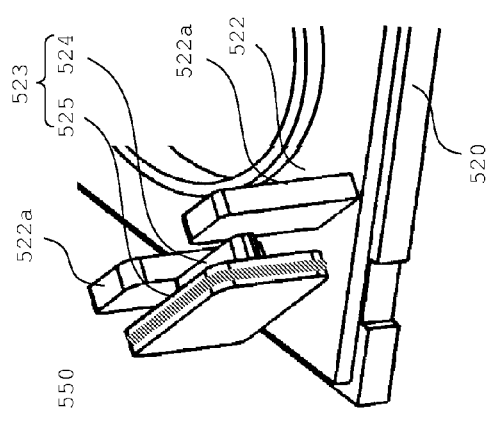

Further, as shown in FIG. 17A, each of the magnetic members 550 may be positioned at a middle part of the guide 525 in a thickness direction, not on an outer side of the guide 525. In this case, the magnetic member 550 is formed at a middle part of the guide 525 by insert molding or the like. At that time, the outer periphery of the magnetic member 550 may be exposed outward as shown in the diagram. Alternatively, the magnetic member 550 may be made slightly smaller in size than the guide 525 so as to be embedded into the guide 525.

In addition, as shown in FIG. 17B, the magnetic member 550 may be made shorter than the magnet 540 in the direction of the optical axis. In this case, the same driving operation as that described above with reference to FIGS. 6A and 6B are carried out. Specifically, the lens holder 510 is stopped in the focused position by regulating amount of electric currents flowing into the coils 560 with respect to the magnetic spring force Fs (refer to FIGS. 6A and 6B) acting on the lens holder 510. After that, the lens holder 510 is held in that position by continuously energizing the coils 560. In this case, each of the magnetic members 550 may be placed at a middle part of the guide 525 in the direction of thickness, as in the case of FIG. 16A.

Figure 17E:
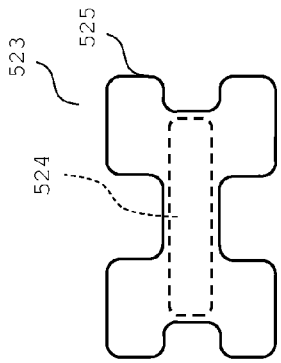
Figure 17D:
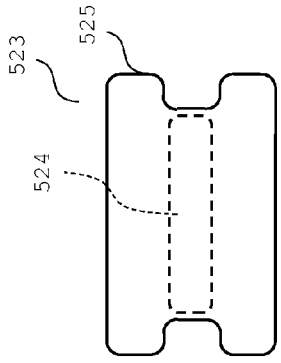
Figure 17C:
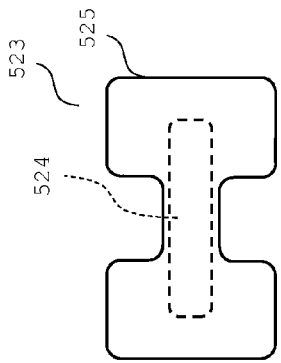

Further, the shape of the guides 525 in the bobbin parts 523 is not limited to a rectangular. For example, as shown in FIGS. 17C, 17D, and 17E, the guides 525 may have a shape that has concaves in midsections of upper and lower sides, a shape that has concaves in midsections of right and left sides, or a shape that has concaves in midsections of upper, lower, right, and left sides. That is, the guides 525 may be shaped in any manner as far as the guides 525 support the coils 560 on outsides thereof. Even if the guides 525 are changed in shape, the magnetic members 550 are still rectangular as in the foregoing embodiment.

Modified Example 2 of Another Embodiment

Figure 18:
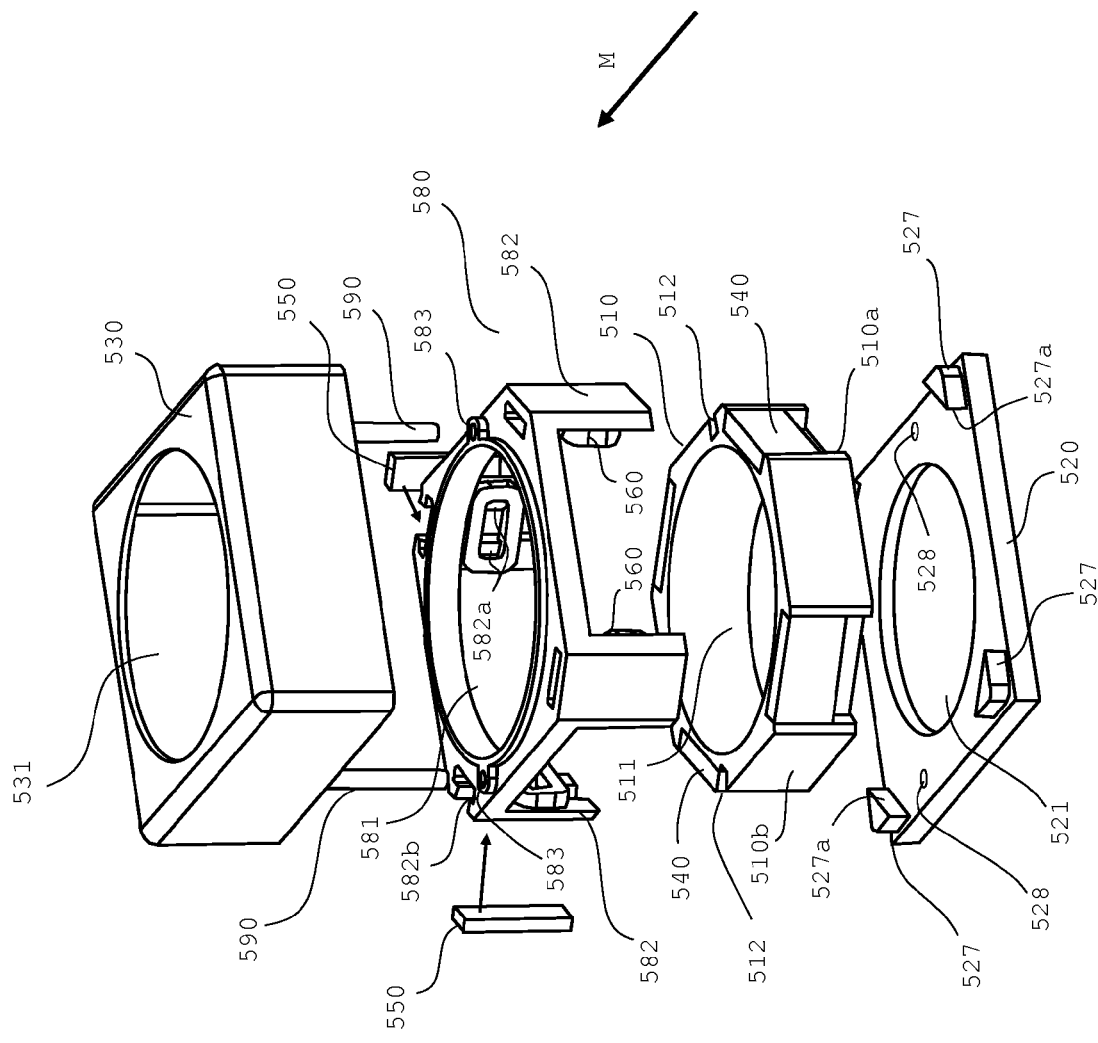
FIG. 18 is a diagram showing an arrangement of a lens drive device in further another modified example of the other embodiment.

FIG. 18 is a diagram for describing another modified example of a lens drive device in another embodiment. In the diagram, the same components as those in FIGS. 13A and 14 are given numbers identical to those in FIGS. 13A and 14.

In this modified example, the coils 560 and the magnetic members 550 are attached by an inner holder 580 to the base 520. The inner holder 580 is a frame member with an opening 581 at a center thereof for transmission of light. The inner holder 580 is formed of a resin material.

The inner holder 580 has four walls 582 extending downward at positions corresponding to the four corners of the base 520. Each of the walls 582 has on an inside thereof a pair of projections 582a projecting inward. Each of the coils 560 is wound around the pair of projections 582a and attached to an inner side of the wall 582. In addition, the two rear walls 582 each have a cut groove 582b through which the coil 560 is exposed laterally. The magnetic member 550 is inserted into the cut groove 582b, attached and fixed to a back side of the coil 582. Further, the inner holder 580 has two vertical through-holes 583 on an upper side surface thereof. Shafts 590 are respectively pressed into these two holes 583. Further, lower ends of the shafts 590 are pressed into holes 528 on the base 520.

The base 520 has pedestals 527 at the four corners. Each of the pedestals 527 has a contact plane 527a that contacts the outside surface of the wall 582 in the inner holder 580. When being attached to the base 520, the inner holder 580 is positioned on the base 520 in such a manner that the outside surfaces of the walls 582 contact the contact planes 527a. At that time, the two holes 583 of the inner holder 580 are opposed to the two holes 528 of the base 520. In such a positioned state, the inner holder 580 has the lower surfaces of the walls 582 attached and fixed to the upper surface of the base 520.

At the attachment, the lens holder 510 is accommodated between the inner holder 580 and the base 520. The lens holder 510 has magnets 540 on four side surfaces 510a thereof. In addition, the lens holder 510 has on the side surfaces two cut grooves 512 for engagement with shafts 590.

When the inner holder 580 is attached to the base 520 with the lens holder 510 inside of the inner holder 580, the coils 560 on the inner sides of the walls 582 are opposed to the magnets 540 of the lens holder 510 with predetermined clearances therebetween. After that, the two shafts 590 are pressed into the holes 583 on the upper surface of the inner holder 580. At that time, the lens holder 510 is positioned such that the two shafts 590 engage with the cut grooves 512. In this state, the two shafts 590 are further pressed to fit the leading ends of the shafts 590 into the holes 528 of the base 520. Accordingly, the two shafts 590 are fitted into the base 520. In addition, by engaging the two shafts 590 with the cut grooves 512 of the lens holder 510, the lens holder 510 can be vertically moved along the shafts 590.

Afterwards, when the cover 530 is attached to the base 520 from above, the lens drive device is completely assembled. The base 520 and the cover 530 form a square box-shaped cabinet, as in the case of FIGS. 13A and 14. The relationship between the coils 560 and the poles of the magnets 540 is the same as the case shown in FIGS. 15A to 15D.

In this modified example, the drive parts formed by the magnets 540 and the coils 560 are arranged at the four corners of the base 520, which allows the lens drive device to be compact. Alternatively, if the lens drive device may be made in a similar size to conventional ones, the lens drive device is still capable of accommodating a larger lens. In addition, according to this modified example, the four coils 560 can be properly positioned by attaching the inner holder 580, which makes the assembly work easier as compared with in the case of the arrangement shown in FIGS. 13A and 14. In addition, the coils 560 are fitted into the inner holder 580, thereby making the attachment of the coils 560 easier.

In this embodiment, since the magnetic members 550 are attached only at two rear ones of the four corners of the inner holder 580, the lens holder 580 is subjected to a force in a backward direction (an M direction shown by an arrow in FIG. 18) by magnetic forces acting between the magnetic members 550 and the two rear magnets 540. This backward force presses the cut grooves 512 of the lens holder 510 against peripheral surfaces of the shafts 590. In this manner, by pressing the cut grooves 512 against the shafts 590, even if the coils 560 are de-energized, the lens holder 510 can be held in the position at the time of de-energization.

<Others>

In the lens drive device of another embodiment, the lens holder 510 may be made circular as shown in FIG. 12A, and plastic magnets may be used for the magnets 540, as in the foregoing embodiment. Further, in the lens drive device of another embodiment, the lens holder 510 may be molded of a plastic material in such a manner that plastic magnets are integrated into other components as shown in FIG. 12B, or may be entirely formed by a plastic magnet as shown in FIG. 12C.

In addition, in the lens drive device of another embodiment, the drive parts may be formed of only the magnets 540 and the coils 560 without the use of the magnetic members 550, as in the foregoing embodiment.

Further, in the lens drive device of another embodiment, the magnetic members 550 may not be necessarily provided at all the four corners. Here, if the magnetic members 550 are disposed at two corners, for example, the two magnetic members 550 may be placed diagonally. This allows the lens holder 510 to be smoothly driven even if the lens drive device is used while the lens holder 510 is moved in the vertical direction, as in the case where the four magnetic members 550 are placed at four corners. Meanwhile, if the magnetic members 550 are disposed at two adjacent corners, the lens holder 510 can be attracted toward one surface of the cover 530 and brought into stable contact with the projection 532 on that surface. Accordingly, it is possible to move the lens holder 510 without backlash.

If the magnetic member(s) 550 are not disposed at all the corners and the hall element 570 is used, it is desired to form the accommodation part 526 at the bobbin part 523 without the magnetic member 550. This eliminates the need to provide the magnetic members 550 with openings, which makes it easier to fabricate the magnetic members 550. In addition, since the magnetic members 550 are not reduced in area by such openings, it is possible to prevent the magnetic members 550 from deteriorating in functionality as a yoke or decreasing in magnetic forces between the magnetic members 550 and the magnets 540.

Further, in the lens drive device of another embodiment, the drive parts are not necessarily disposed at all the corners as far as the drive parts can provide a significant propulsive force toward the lens holder 510, as in the foregoing embodiment.

Besides, embodiments of the present invention can be modified in various manners as appropriate, without departing from the scope of a technical idea described in the claims.

What is claimed is:

1. A lens drive device, comprising:
   a holder for holding a lens;
   a base to which the holder is supported so as to be capable of being displaced in a direction of an optical axis of the lens; and
   a drive part for displacing the holder using a magnetic driving force in the direction of the optical axis, wherein
      the base has an almost square shape in a direction vertical to the optical axis,
      the drive part is situated in a region between an outer edge of the holder and a corner of the base, and
      the drive part comprises a magnet disposed on the holder and a coil opposed to the magnet and disposed on the base.

2. The lens drive device according to claim 1, wherein the drive part further comprises a magnetic member opposed to the magnet and disposed on the base.

3. The lens drive device according to claim 2, wherein a length of the magnetic member in the direction of the optical axis is larger than a length of the magnet in the direction of the optical axis.

4. The lens drive device according to claim 2, wherein a length of the magnetic member in the direction of the optical axis is smaller than a length of the magnet in the direction of the optical axis.

5. The lens drive device according to claim 1, wherein
   a columnar part with an almost triangular cross section protrudes from the base in the region between the outer edge of the holder and the corner of the base,
   one plane of the columnar part is opposed to a plane of the magnet disposed on the holder,
   one corner of the columnar part is situated in a vicinity of the corner of the base, and
   the coil is attached around the columnar part.

6. The lens drive device according to claim 5, wherein
   a combination of the columnar part, the magnet, and the coil is disposed between each of the four corners of the base and the outer edge of the holder.

7. The lens drive device according to claim 5, wherein
a magnetic member is attached to the plane of the columnar part opposed to the plane of the magnet, and
a part of the coil is disposed between the magnetic member and the magnet.

8. The lens drive device according to claim 1, further comprising:
a frame member to which the coil is attached and which is capable of accommodating the lens holder, wherein
a positioning part is disposed on the base to engage with the frame member and position the frame member, and
the frame member is attached to the base in accommodating the lens holder, whereby the magnet and the coil are opposed to each other.

9. The lens drive device according to claim 8, wherein
the magnet and the coil are disposed in the regions corresponding to the four corners of the base, and
the four coils are attached to the frame member.

10. A lens drive device according to claim 8, wherein
a shaft is attached parallel to the optical axis of the lens between the frame member and the base, and
an engagement part is disposed on the lens holder for engagement with the shaft.

11. The lens drive device according to claim 10, wherein
the magnetic member is disposed on the frame member in such a manner that the engagement part is pressed by a magnetic force of the magnet against a peripheral surface of the shaft.

12. A lens drive device, comprising:
a holder for holding a lens;
a base to which the holder is supported so as to be capable of being displaced in a direction of an optical axis of the lens; and
a drive part for displacing the holder using a magnetic driving force in the direction of the optical axis, wherein
the base has an almost square shape in a direction vertical to the optical axis,
the drive part is situated in a region between an outer edge of the holder and a corner of the base, and
the drive part comprises a magnetic member disposed on the holder and an electrical magnet for imparting a magnetic force to the magnetic member.

13. A lens drive device, comprising:
a holder for holding a lens;
a base to which the holder is supported so as to be capable of being displaced in a direction of an optical axis of the lens; and
a drive part for displacing the holder using a magnetic driving force in the direction of the optical axis, wherein
the base has an almost square shape in a direction vertical to the optical axis,
the drive part is situated in a region between an outer edge of the holder and a corner of the base, and
the drive part comprises:
a magnet disposed on a side surface of the holder,
a coil opposed to the magnet,
a bobbin part around which the coil is wound along a plane of the magnet opposed to the coil, and
a support member disposed on the base side and supporting the bobbin part.

14. The lens drive device according to claim 13, wherein
the magnet protrudes from the side surface of the holder,
the support member has a clearance opened on an upper side, and
the magnet is accommodated in the clearance.

15. The lens drive device according to claim 13, wherein
a position sensor is disposed on the bobbin part to magnetically detect a position of the holder.

* * * * *